(12) United States Patent
Hamaguchi et al.

(10) Patent No.: US 11,796,980 B2
(45) Date of Patent: Oct. 24, 2023

(54) ADDITIVE-MANUFACTURED OBJECT DESIGN SUPPORTING DEVICE AND ADDITIVE-MANUFACTURED OBJECT DESIGN SUPPORTING METHOD

(71) Applicant: Hitachi, Ltd., Tokyo (JP)

(72) Inventors: Takashi Hamaguchi, Tokyo (JP); Tadashi Fujieda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 469 days.

(21) Appl. No.: 17/047,010

(22) PCT Filed: Mar. 15, 2019

(86) PCT No.: PCT/JP2019/010759
§ 371 (c)(1),
(2) Date: Oct. 12, 2020

(87) PCT Pub. No.: WO2019/198417
PCT Pub. Date: Oct. 17, 2019

(65) Prior Publication Data
US 2021/0080930 A1    Mar. 18, 2021

(30) Foreign Application Priority Data

Apr. 13, 2018 (JP) ................................ 2018-077301

(51) Int. Cl.
*G05B 19/4099* (2006.01)
*B33Y 50/00* (2015.01)
(Continued)

(52) U.S. Cl.
CPC .......... *G05B 19/4099* (2013.01); *B22F 10/80* (2021.01); *B33Y 50/00* (2014.12);
(Continued)

(58) Field of Classification Search
CPC ...... G05B 19/4099; G05B 2219/49023; B22F 10/80; B22F 10/28; B22F 10/85;
(Continued)

(56) References Cited

U.S. PATENT DOCUMENTS

| 10,885,706 B2* | 1/2021 | Zagade ................. G06T 17/205 |
| 2016/0086376 A1* | 3/2016 | Tang ..................... B29C 64/386 |
| | | 345/420 |

(Continued)

FOREIGN PATENT DOCUMENTS

| JP | 2017-77671 A | 4/2017 |
| JP | 2017-161981 A | 9/2017 |
| JP | 2017161981 A * | 9/2017 .............. B22F 10/30 |

OTHER PUBLICATIONS

Zhibo Luo, Yaoyao Zhao, A survey of finite element analysis of temperature and thermal stress fields in powder bed fusion Additive Manufacturing, Additive Manufacturing, vol. 21, 2018, pp. 318-332, ISSN 2214-8604, ttps://doi.org/10.1016/j.addma.2018.03.022. (Year: 2018).*

(Continued)

*Primary Examiner* — Eunhee Kim
(74) *Attorney, Agent, or Firm* — Crowell & Moring LLP

(57) ABSTRACT

When the temperature history in a fine mesh is obtained for the entire modeled object, it takes a huge amount of time in calculation. In order to solve the problem, An additive-manufactured object design supporting device, comprising: an analysis unit configured to analyze a modeling process of a macro-region and a micro-region by using a product shape, a material condition, and a modeling condition of a modeled object as input; a temperature history extraction unit configured to extract, from a temperature analysis result of the macro-region, a local temperature history by referring to a database that stores a temperature history of the micro-region; a mapping unit configured to map a structure distri- (Continued)

bution obtained from a temperature history distribution of the modeled object to the modeled object; and an extraction unit configured to extract a defective structure that does not satisfy a structure condition by using an allowable structure condition as input.

5 Claims, 10 Drawing Sheets

(51) Int. Cl.
*B22F 10/80* (2021.01)
*B33Y 50/02* (2015.01)
*G06F 30/00* (2020.01)
*G06F 30/20* (2020.01)
*B22F 10/28* (2021.01)
*G06F 113/10* (2020.01)
*G06F 119/18* (2020.01)

(52) U.S. Cl.
CPC .............. *B33Y 50/02* (2014.12); *G06F 30/00* (2020.01); *G06F 30/20* (2020.01); *B22F 10/28* (2021.01); *G05B 2219/49023* (2013.01); *G06F 2113/10* (2020.01); *G06F 2119/18* (2020.01)

(58) Field of Classification Search
CPC ......... B33Y 50/00; B33Y 50/02; B33Y 10/00; G06F 30/00; G06F 30/20; G06F 2113/10; G06F 2119/18; Y02P 90/02; Y02P 10/25; B29C 64/393; B29C 64/153
See application file for complete search history.

(56) References Cited

U.S. PATENT DOCUMENTS

2016/0246908 A1* 8/2016 Komzsik ................ B29C 67/00
2019/0143607 A1* 5/2019 Ogawa ................ B29C 64/386
374/55

OTHER PUBLICATIONS

International Search Report (PCT/ISA/210) issued in PCT Application No. PCT/JP2019/010759 dated May 28, 2019 with English translation (three pages).
Japanese-language Written Opinion (PCT/ISA/237) issued in PCT Application No. PCT/JP2019/010759 dated May 28, 2019 (three pages).

* cited by examiner

FIG. 9 ⌒241

| No. | BOTTOM SURFACE TEMPERATURE | FIRST SIDE SURFACE TEMPERATURE BEFORE HEAT INPUT | SECOND SIDE SURFACE TEMPERATURE BEFORE HEAT INPUT | THIRD SIDE SURFACE TEMPERATURE BEFORE HEAT INPUT | FOURTH SIDE SURFACE TEMPERATURE BEFORE HEAT INPUT | FIRST SIDE SURFACE TEMPERATURE AFTER HEAT INPUT | SECOND SIDE SURFACE TEMPERATURE AFTER HEAT INPUT | THIRD SIDE SURFACE TEMPERATURE AFTER HEAT INPUT | FOURTH SIDE SURFACE TEMPERATURE AFTER HEAT INPUT |
|---|---|---|---|---|---|---|---|---|---|
| 0 | 20°C | 20°C | 20°C | 20°C | 20°C | 600°C | 600°C | 600°C | 600°C |
| 1 | 20°C | 20°C | 20°C | 600°C | 20°C | 600°C | 600°C | 600°C | 600°C |
| 2 | 20°C | 20°C | 600°C | 20°C | 20°C | 600°C | 600°C | 600°C | 600°C |
| 3 | 20°C | 20°C | 600°C | 600°C | 20°C | 600°C | 600°C | 600°C | 600°C |
| 4 | 20°C | 600°C | 20°C | 20°C | 20°C | 600°C | 600°C | 600°C | 600°C |
| 5 | 20°C | 600°C | 20°C | 600°C | 20°C | 600°C | 600°C | 600°C | 600°C |
| 6 | 20°C | 600°C | 600°C | 20°C | 20°C | 600°C | 600°C | 600°C | 600°C |
| 7 | 20°C | 600°C | 600°C | 600°C | 20°C | 600°C | 600°C | 600°C | 600°C |
| 8 | 600°C | 20°C | 20°C | 20°C | 20°C | 600°C | 600°C | 600°C | 600°C |
| 9 | 600°C | 20°C | 20°C | 20°C | 20°C | 600°C | 600°C | 600°C | 600°C |
| 10 | 600°C | 20°C | 600°C | 20°C | 20°C | 600°C | 600°C | 600°C | 600°C |
| ⋮ | ⋮ | ⋮ | ⋮ | ⋮ | ⋮ | ⋮ | ⋮ | ⋮ | ⋮ |

| No | GEOMETRIC SHAPE OF BOTTOM | GEOMETRIC SHAPE OF FIRST SIDE SURFACE BEFORE HEAT INPUT | GEOMETRIC SHAPE OF SECOND SIDE SURFACE BEFORE HEAT INPUT | GEOMETRIC SHAPE OF THIRD SIDE SURFACE BEFORE HEAT INPUT | GEOMETRIC SHAPE OF FOURTH SIDE SURFACE BEFORE HEAT INPUT | GEOMETRIC SHAPE OF FIRST SIDE SURFACE AFTER HEAT INPUT | GEOMETRIC SHAPE OF SECOND SIDE SURFACE AFTER HEAT INPUT | GEOMETRIC SHAPE OF THIRD SIDE SURFACE AFTER HEAT INPUT | GEOMETRIC SHAPE OF FOURTH SIDE SURFACE AFTER HEAT INPUT | CONTACT GAS ON UPPER SURFACE |
|---|---|---|---|---|---|---|---|---|---|---|
| 1 | SOLIDIFIED | POWER | POWER | POWER | POWER | SOLIDIFIED | SOLIDIFIED | SOLIDIFIED | SOLIDIFIED | NITROGEN |
| 2 | SOLIDIFIED | POWER | POWER | SOLIDIFIED | POWER | SOLIDIFIED | SOLIDIFIED | SOLIDIFIED | SOLIDIFIED | NITROGEN |
| 3 | SOLIDIFIED | POWER | SOLIDIFIED | POWER | POWER | SOLIDIFIED | SOLIDIFIED | SOLIDIFIED | SOLIDIFIED | NITROGEN |
| 4 | SOLIDIFIED | POWER | SOLIDIFIED | SOLIDIFIED | POWER | SOLIDIFIED | SOLIDIFIED | SOLIDIFIED | SOLIDIFIED | NITROGEN |
| 5 | SOLIDIFIED | SOLIDIFIED | POWER | POWER | POWER | SOLIDIFIED | SOLIDIFIED | SOLIDIFIED | SOLIDIFIED | NITROGEN |
| 6 | SOLIDIFIED | SOLIDIFIED | POWER | SOLIDIFIED | POWER | SOLIDIFIED | SOLIDIFIED | SOLIDIFIED | SOLIDIFIED | NITROGEN |
| 7 | SOLIDIFIED | SOLIDIFIED | SOLIDIFIED | POWER | POWER | SOLIDIFIED | SOLIDIFIED | SOLIDIFIED | SOLIDIFIED | NITROGEN |
| 8 | SOLIDIFIED | SOLIDIFIED | SOLIDIFIED | SOLIDIFIED | POWER | SOLIDIFIED | SOLIDIFIED | SOLIDIFIED | SOLIDIFIED | NITROGEN |
| 9 | POWER | POWER | POWER | POWER | POWER | SOLIDIFIED | SOLIDIFIED | SOLIDIFIED | SOLIDIFIED | NITROGEN |
| ... | ... | ... | ... | ... | ... | ... | ... | ... | ... | ... |
| ... | SOLIDIFIED | POWER | POWER | POWER | POWER | MOLTEN | MOLTEN | MOLTEN | MOLTEN | ARGON |
| ... | POWER | POWER | POWER | POWER | POWER | MOLTEN | MOLTEN | MOLTEN | MOLTEN | ARGON |
| ... | ... | ... | ... | ... | ... | ... | ... | ... | ... | ... |

ADDITIVE-MANUFACTURED OBJECT DESIGN SUPPORTING DEVICE AND ADDITIVE-MANUFACTURED OBJECT DESIGN SUPPORTING METHOD

TECHNICAL FIELD

The present invention relates to an additive-manufactured object design supporting device and an additive-manufactured object design supporting method that support a design of an additive-manufactured object formed by a three-dimensional printer.

BACKGROUND ART

Additive manufacturing generally means that a model (hereafter referred to as a modeling model) in which support is added to three-dimensional shape data (hereinafter, referred to as a modeled object) created based on computer aided design (CAD) data or the like is used as input data, and a three-dimensional object (hereinafter, referred to as a modeling shape) having the same shape as the modeling model is output, and is a form of three-dimensional printing.

The additive manufacturing is a technique of shaping by stacking layers each having a thickness of several tens to several hundreds of μm. The additive manufacturing using a metal material is generally a method of shaping by melting and bonding a material with heat, and various methods such as a powder bed fusion bonding method and a directed energy deposition method are adopted.

The powder bed fusion bonding method is also called a powder bed method, and is a method in which powder is spread layer by layer in a region including a cross section of the modeling shape, and a portion having the modeling shape is melted and bonded by a laser or an electron beam. The directed energy deposition method is also called a powder deposition method, and is a method in which powder is supplied to a portion having the modeling shape and melted and bonded by a laser or the like.

In any of these methods, conditions such as heat input and heat dissipation differ depending on an irradiation condition of the laser, a shape of the modeled object, or the like, so that a temperature history is different. The temperature history means a history of a temperature change that the modeling shape undergoes. In the metal material, a material structure changes depending on a difference in the temperature history, and therefore, material physical properties of the modeled object are not always the same even when the same powder is used for the modeling. Due to a difference in the material physical properties, a defective structure region may occur. In the additive manufacturing, it is important to predict this defective structure region.

PTL 1 discloses a technique of calculating the temperature history by a finite element method by dividing 3D CAD data of the modeling shape into meshes since a residual stress varies depending on each part of the modeled object. As a result, an effect of a heat input condition on strain is obtained by microscale analysis for a local region, a deformation or the residual stress is predicted by inputting the strain (inherent strain) obtained by this analysis and analyzing a macro-region for an entire region of the modeled object.

PRIOR ART LITERATURE

Patent Literature
PTL 1: JP-A-2017-161981

SUMMARY OF INVENTION

Technical Problem

As described above, the temperature history of the modeled object is different for each part. When the temperature history in a fine mesh is obtained for the entire modeled object, it takes a huge amount of time in calculation, so that it is difficult to obtain the defective structure region. Therefore, in the related art, a structure defect of the modeling shape occurs, and reworking for dealing with the structure defect occurs.

Therefore, an object of the invention is to calculate a temperature history different for each part in a short time to obtain a structure defect region and prevent reworking caused by a structure defect.

Solution to Problem

In order to solve the above problem, an additive-manufactured object design supporting device of the invention includes: an analysis unit configured to analyze a modeling process of a macro-region and a micro-region by using a product shape, a material condition, and a modeling condition of a modeled object as input; a temperature history extraction unit configured to extract, from a temperature analysis result of the macro-region, a local temperature history by referring to a database that stores a temperature history of the micro-region; a mapping unit configured to map a structure distribution obtained from a temperature history distribution of the modeled object to the modeled object; and an extraction unit configured to extract a defective structure that does not satisfy a structure condition by using an allowable structure condition as input.

Other means will be described in embodiments for carrying out the invention.

Advantageous Effect

According to the invention, the temperature history different for each part can be calculated in a short time, whereby the structure defect region can be obtained and reworking caused by the structure defect can be prevented.

Further, since it is possible to clearly show a position where a structure state value exceeds an allowable threshold value, it is possible to give a clue when a design of the modeled object is changed. As a result, it is possible to carryout a preliminary examination when a modeled object having the same material physical property is shaped.

BRIEF DESCRIPTION OF DRAWINGS

FIG. 9 is a diagram showing an example of a pre-heat input temperature classification table.

FIG. 10 is a diagram showing an example of a geometric shape classification table.

DESCRIPTION OF EMBODIMENTS

Hereinafter, an input data generation device for additive manufacturing of the invention will be described in detail with reference to the drawings.

An operation of a three-dimensional printer of a powder bed fusion bonding type, which is a typical metal additive manufacturing method, will be described with reference to FIGS. 2 to 5. This three-dimensional printer outputs a three-dimensional object (hereinafter referred to as a modeling shape) having the same shape as a modeling model when the modeling model created by the input data generation device for additive manufacturing is input.

Figure 2:
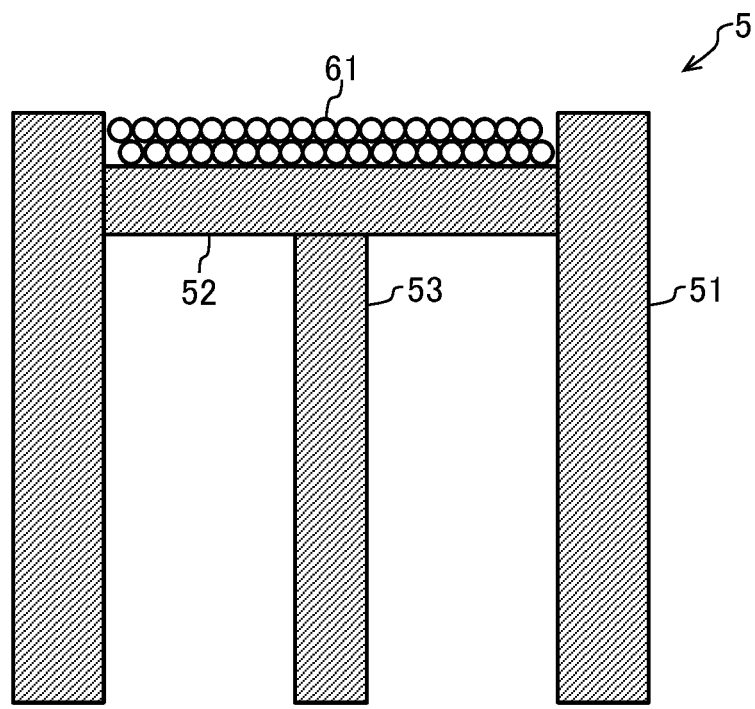
FIG. 2 is a diagram showing an operation of spreading powder in an additive manufacturing method.

FIG. 2 is a diagram showing an operation in which a three-dimensional printer 5 of the powder bed fusion bonding type spreads material powder 61.

The three-dimensional printer 5 includes a tubular chamber 51, a stage 52 provided in the chamber 51, and a support portion 53 that moves the stage 52 up and down.

In the three-dimensional printer 5 of the powder bed fusion bonding type, when the support portion 53 is lowered by a predetermined distance, the material powder 61 supplied from a supply portion (not shown) is spread onto the stage 52 by a bar (not shown) or the like. As a result, a layer of the material powder 61 having a predetermined thickness is formed on the stage 52.

Figure 3:
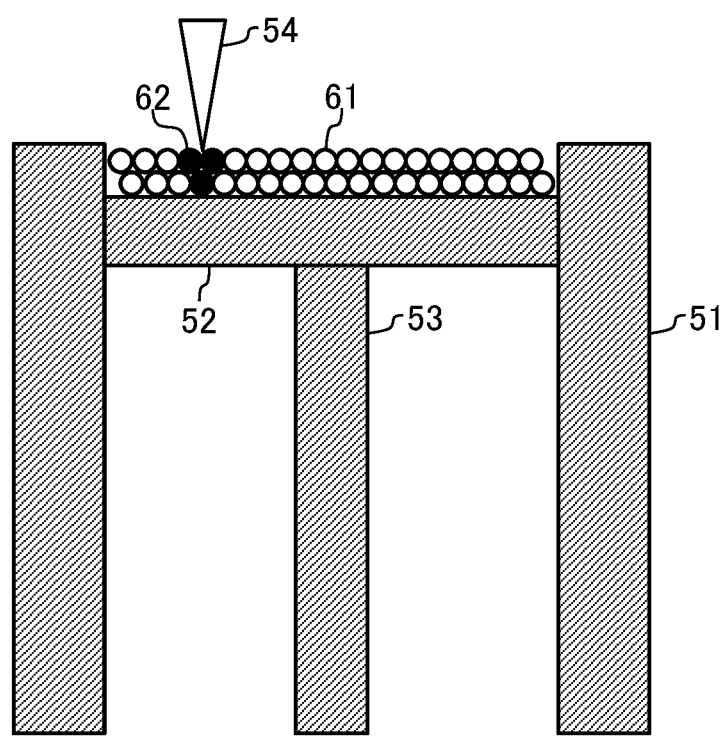
FIG. 3 is a diagram showing laser irradiation to the powder in the additive manufacturing method.

FIG. 3 is a diagram showing laser irradiation of the three-dimensional printer 5 to the powder.

The three-dimensional printer 5 emits a laser 54 to a desired position from an irradiation unit (not shown). As a result, the material powder 61 at an irradiation part is melted and bonded. In this way, a part of a three-dimensional object 62 is formed.

Figure 4:
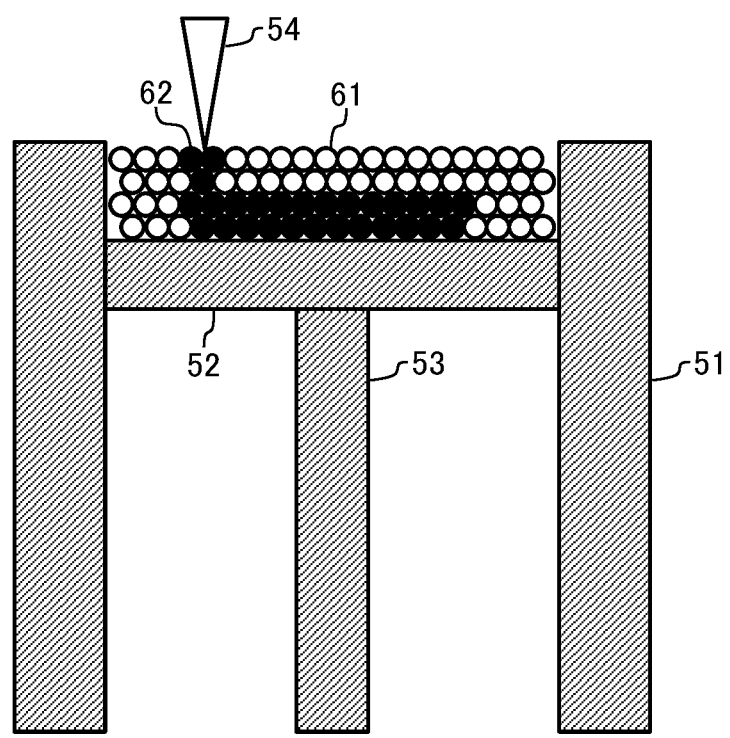
FIG. 4 is a diagram showing that powder spreading and the laser irradiation are repeated in the additive manufacturing method.

FIG. 4 is a diagram showing that the three-dimensional printer 5 repeats powder spreading and the laser irradiation.

Here, the three-dimensional printer 5 spreads the material powder 61 of an amount of one layer and emits the laser 54, further spreads the material powder 61 of an amount of one layer, and then emits the laser 54. In this way, a part of the three-dimensional object 62 is formed.

Figure 5:
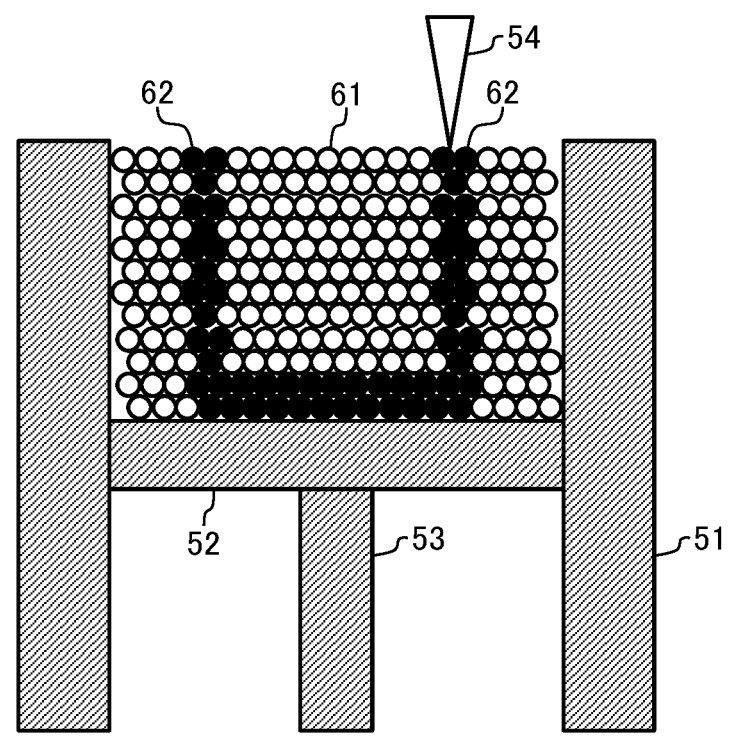
FIG. 5 is a diagram showing an object modeled by the additive manufacturing method.

FIG. 5 is a diagram showing an object modeled by an additive manufacturing method.

Here, it is shown that the three-dimensional printer 5 forms the three-dimensional object 62 by repeating the spreading of the material powder 61 of an amount of one layer and the laser irradiation six times.

When the three-dimensional object 62 is formed, the material powder 61 remains as it is. The material powder 61 stuck to the to-be-taken out three-dimensional object 62 is removed by a treatment such as blowing the power off with a gas. It is a basic fact that, as described above, a part to be melted and bonded is formed as an upper part of the melted and bonded part (including an oblique upper part whose horizontal length is within an allowable range). However, in many cases, a shape of an optionally designated modeled object requires melting and bonding of an upper part of an un-molten portion, and a support is provided to keep the above basic fact. Therefore, a molten region is in contact with a modeling material, a base plate material, an atmosphere or the like. This modeling material is in a plurality of states such as a powder state, a molten state, and a state after melting and solidification.

Hereinafter, a device configuration of the invention will be described.

Figure 1:
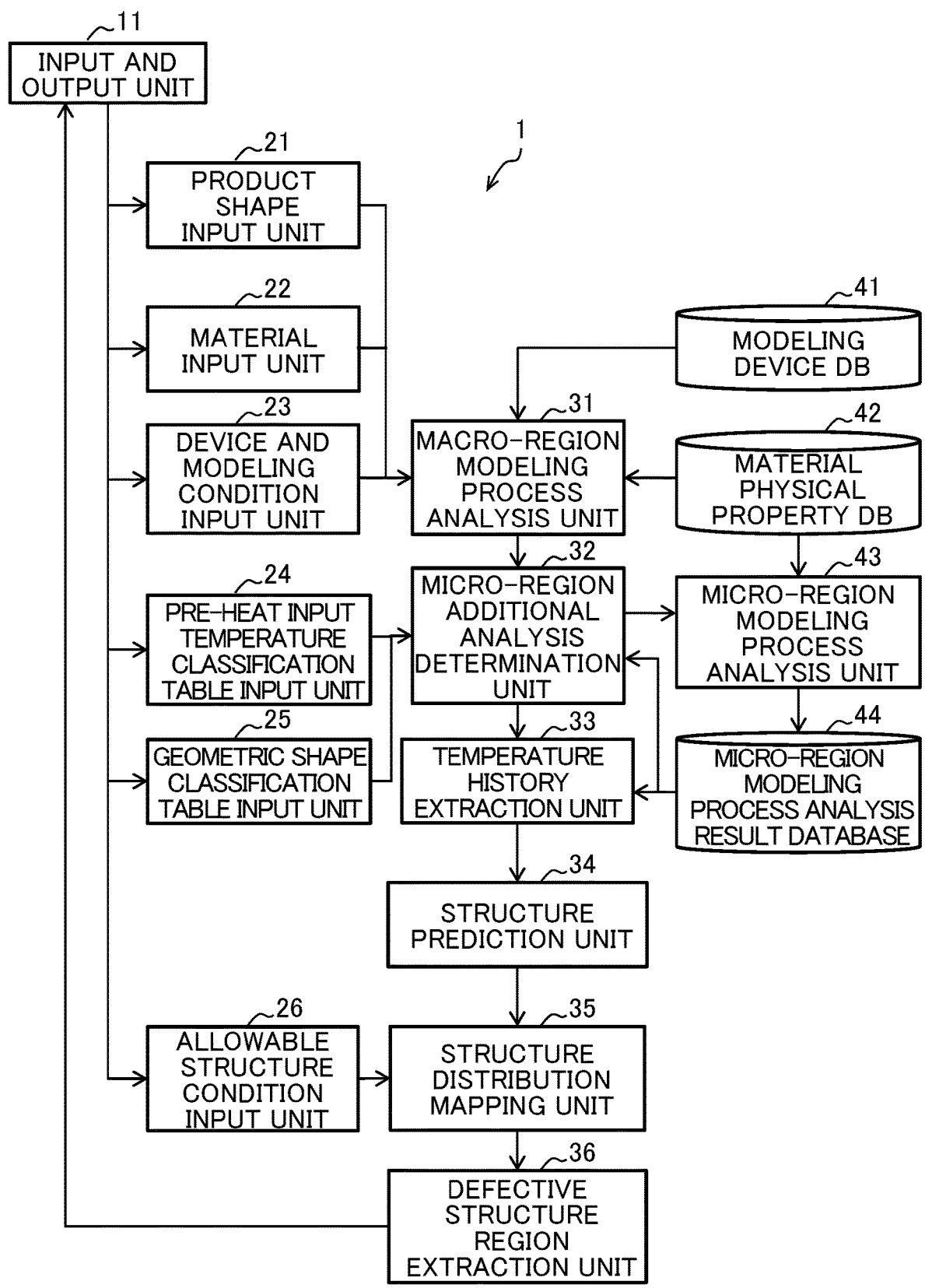
FIG. 1 is a configuration diagram of an input data generation device for additive manufacturing in the present embodiment.

FIG. 1 is a configuration diagram of an input data generation device for additive manufacturing 1 in the present embodiment.

The input data generation device for additive manufacturing (additive-manufactured object design supporting device) includes, in order to input information necessary for general additive manufacturing, a product shape input unit 21, a material input unit 22, a device and modeling condition input unit 23. The product shape input unit 21 is a part for inputting a shape for the additive manufacturing. The material input unit 22 is a part for inputting a powder name of a raw material and a material name of a base plate. The device and modeling condition input unit 23 is a part for inputting a device condition such as a moving speed of the laser 54 and other modeling conditions.

A pre-heat input temperature classification table input unit 24 outputs a pre-heat input temperature classification table 241, in which a temperature increment necessary for determining a defective structure, or the like is set as a boundary condition of a micro-region, to a micro-region additional analysis determination unit 32.

A geometric shape classification table input unit 25 outputs a geometric shape classification table 251, in which a classification of geometric shapes (a powder shape, a molten shape, and a solidified shape) around the micro-region is set, to the micro-region additional analysis determination unit 32.

These tables and information obtained from a modeling device database 41, and a material physical property database 42 is input to a macro-region modeling process analysis unit 31 for calculating an approximate temperature history of an entire modeled object. Then, with a temperature and a shape of a result obtained by the macro-region modeling process analysis unit 31 as keys, the micro-region additional analysis determination unit 32 determines whether or not there is corresponding temperature history and geometric shape data in a micro-region modeling process analysis result database 44 that accumulates temperature history calculation results near a laser irradiation unit.

At this time, when there is no corresponding temperature history and geometric shape data, the temperature and the shape of the result is analyzed by a micro-region modeling process analysis unit 43 and stored in the micro-region modeling process analysis result database 44. Then, a temperature history extraction unit 33 based on a pre-heat input temperature and a geometric shape extracts a corresponding temperature history. At this time, a cooling rate and a temperature gradient, which are temperature indexes having a large influence on a metal structure, may be calculated and extracted.

Next, a structure prediction unit 34 that predicts a structure based on the temperature history predicts the structure for each node of a finite element analysis mesh, for example. At this time, in addition to methods such as an experimentally obtained mathematical formula or a phase field method, necessary data may be extracted by setting a relationship between the temperature index obtained from the temperature history and the metal structure in such as a solidification map as a solidification map database.

Subsequently, an allowable structure condition input unit 26 inputs an allowable threshold value of a structure index. A structure distribution mapping unit 35 maps a predicted metal structure onto the modeled object. A defective structure region extraction unit 36 extracts, as a defect region, an unallowable metal structure from visualization data obtained by mapping the predicted metal structure on the modeled object, and displays the defect region on an input and output unit 11. As a result, for example, by visualizing positions of a structure determined to be a defect in an analysis result inside the modeled object and evaluating these positions by means such as a material test, reliability of the entire modeled object can be efficiently evaluated.

Hereinafter, a processing flow executed by a main component of the invention will be described. In order to simplify this description, an example in which a mesh used in the macro-region modeling process analysis unit 31 is a set of hexahedral elements is used.

Figure 6:
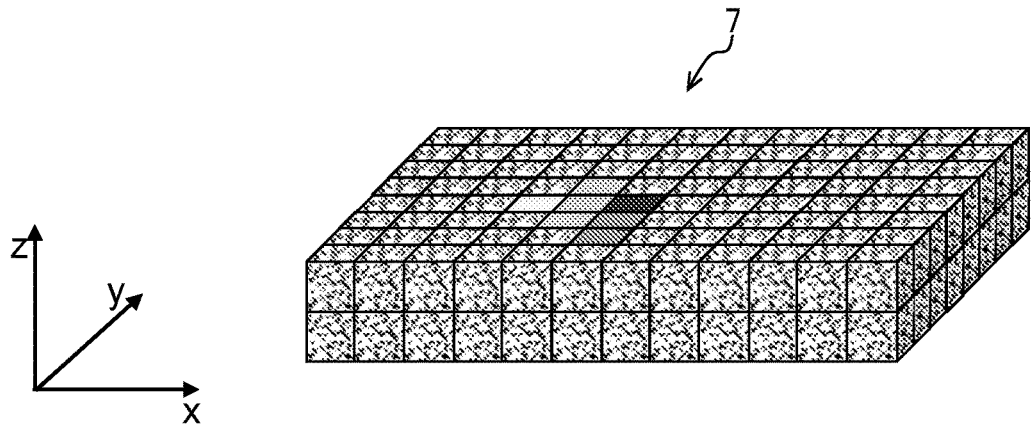
FIG. 6 is a diagram showing a mesh used in a macro-region.

FIG. 6 is a diagram showing the mesh used in a macro-region. The mesh used in the macro-region of a modeled object 7 is a hexahedron in an orthogonal lattice shape. A normal line to each surface of this mesh is parallel to any of an x axis, a y axis, and a z axis, as shown in FIG. 6. Among these axes, a +z axis direction is a laminating direction.

Figure 7:
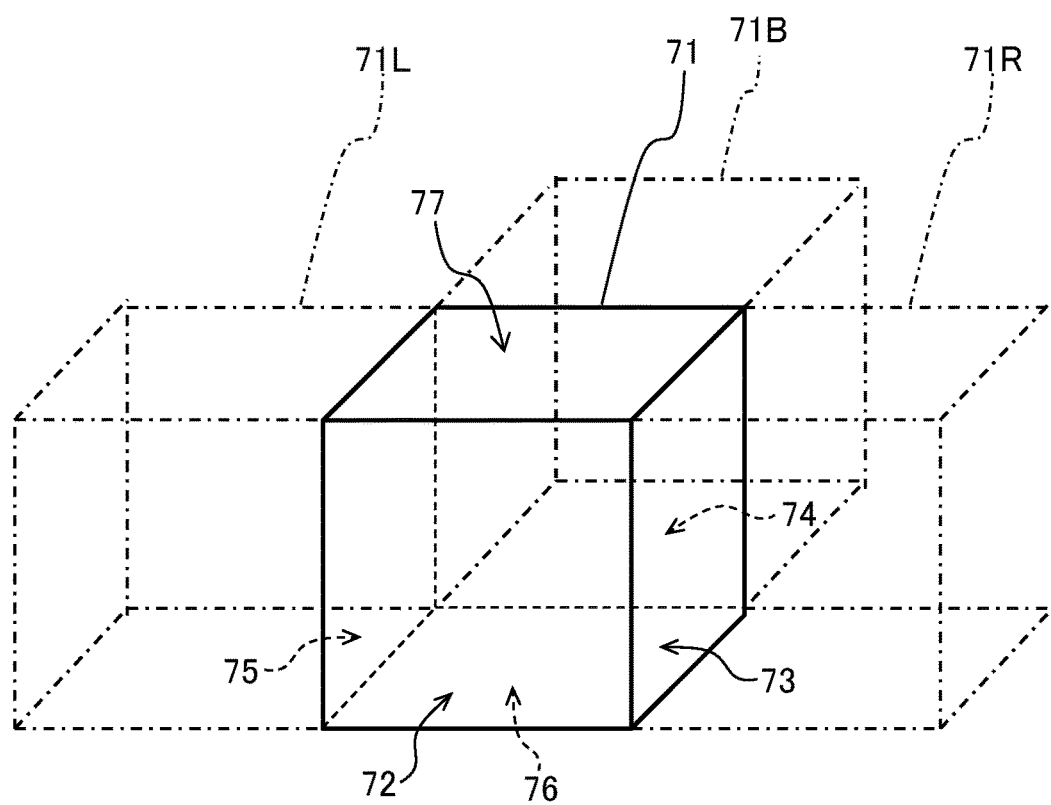
FIG. 7 is a diagram showing each surface of a micro-region.

FIG. 7 is a diagram showing each surface of the micro-region. A hexahedral mesh 71 has the orthogonal lattice shape. Respective surfaces of the hexahedral mesh 71 in an x axis direction or a y axis direction are side surfaces 72 to 75 of the micro-region, and a surface in a −z axis direction is a bottom surface 76 of the micro area. An upper surface 77 in the +z axis direction is open to an upper space.

The hexahedral mesh 71 is in contact with a previous laminating region at the bottom surface 76 and in contact with adjacent meshes at the side surfaces 72 to 75. The hexahedral mesh 71 is in contact with a mesh 71R adjacent to a right side thereof via the side surface 73, and is in contact with a mesh 71L adjacent to a left side thereof via the side surface 75. The hexahedral mesh 71 is further in contact with a mesh 71B adjacent to a back side thereof via the side surface 74, and is in contact with a mesh (not shown) adjacent to a front side thereof via the side surface 72. A temperature history of the hexahedral mesh 71 can be determined based on a temperature and a state of the adjacent mesh.

Figure 8:
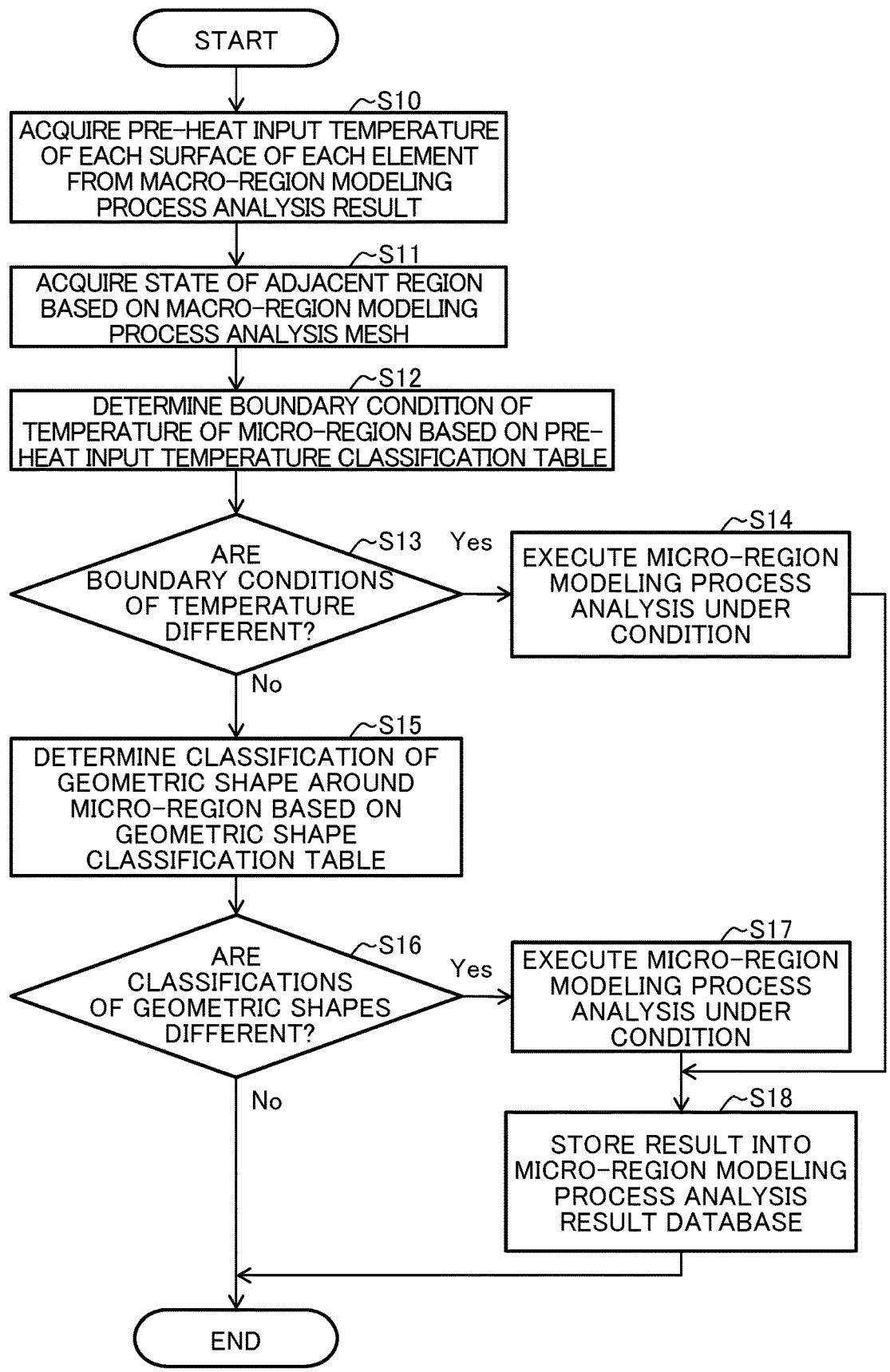
FIG. 8 is a flowchart showing processing of a micro-region additional analysis determination unit.

FIG. 8 is a flowchart showing processing of the micro-region additional analysis determination unit 32.

The micro-region additional analysis determination unit 32 executes the following processing. Hereinafter, in order to simplify the description, a case of the hexahedral mesh of the orthogonal lattice shape will be described as an example.

The micro-region additional analysis determination unit 32 acquires a pre-heat input temperature of each surface of each element from a macro-region modeling process analysis result (step S10). Then, the micro-region additional analysis determination unit 32 acquires a state (a powder state, a molten state, a solidified state, or the like) of an adjacent region based on the mesh analyzed by the macro-region modeling process analysis unit (step S11).

The micro-region additional analysis determination unit 32 determines the boundary condition of the temperature of the micro-region based on the pre-heat input temperature classification table 241 (see FIG. 9) (step S12). The micro-region additional analysis determination unit 32 further determines whether or not a latest result in the micro-region modeling process analysis result database 44 is different from the boundary condition analyzed by the macro-region modeling process analysis unit 31 (step S13).

In step S13, when the latest result in the micro-region modeling process analysis result database 44 is different from the boundary condition analyzed by the macro-region modeling process analysis unit 31 (Yes), a micro-region modeling process analysis is performed under the condition (step S14), and the micro-region additional analysis determination unit 32 stores the result thereof into the micro-region modeling process analysis result database 44 (step S18). When the latest result in the micro-region modeling process analysis result database 44 is not different from the boundary condition analyzed by the macro-region modeling process analysis unit 31 (No), the micro-region additional analysis determination unit 32 proceeds to processing of step S15.

FIG. 9 is a diagram showing an example of the pre-heat input temperature classification table 241.

The pre-heat input temperature classification table 241 is a table in which a bottom surface temperature and first to fourth side surface temperatures before a heat input are associated with first to fourth side surface temperatures after the heat input. As described above, since a boundary condition of a local region is simplified, the number of analyses of a micro-region modeling process can be reduced. In addition, the temperature history that differs for each part can be obtained in a short time by referring to the table. Here, a temperature is formed of a combination of 20° C. and 600° C., but a finer temperature increment may be used. The pre-heat input temperature classification table 241 may be, for example, a list of analysis conditions that are verified by experiments, and may be a table in which temperatures of a plurality of indexes are combined.

With reference to FIG. 8 again, the processing of step S15 will be described. The micro-region additional analysis determination unit 32 determines the classification of the geometric shapes (the powder shape, the molten shape, and the solidified shape) around the micro-region based on the geometric shape classification table 251 (see FIG. 10) (step S15). Further, the micro-region additional analysis determination unit 32 determines whether or not the latest result in the micro-region modeling process analysis result database 44 is different from classification of the geometric shapes analyzed by the macro-region modeling process analysis unit 31 (step S16).

In step S16, when the classification of the geometric shapes of the latest result in the micro-region modeling process analysis result database 44 is different from the classification of the geometric shapes analyzed by the macro-region modeling process analysis unit 31 (Yes), the micro-region modeling process analysis is performed under the condition by the micro-region additional analysis determination unit 32 (step S17). The micro-region additional analysis determination unit 32 stores the result into the micro-region modeling process analysis result database 44 (step S18).

In step S16, when the classification of the geometric shapes of the latest result in the micro-region modeling process analysis result database 44 is not different from the classification of the geometric shapes analyzed by the macro-region modeling process analysis unit 31 (No), the micro-region additional analysis determination unit 32 ends the processing of FIG. 8.

FIG. 10 is a diagram showing an example of the geometric shape classification table 251.

The geometric shape classification table 251 is a table in which the geometric shapes of the bottom surface and the first to fourth side surfaces before the heat input are associated with contact gas on an upper surface and the geometric shapes of the first to fourth side surfaces after the heat input. As described above, since the classification of the geometric shapes of the micro-region is simplified, the number of the analyses of the micro-region modeling process can be reduced. In addition, the temperature history that differs for each part can be obtained in a short time by referring to the table.

The geometric shape classification table 251 may be, for example, a list of analysis conditions that are verified by the experiments, and may be a table in which temperatures of a plurality of indexes are combined, and not only solid conditions but also liquid or gas conditions may be set.

Figure 11:
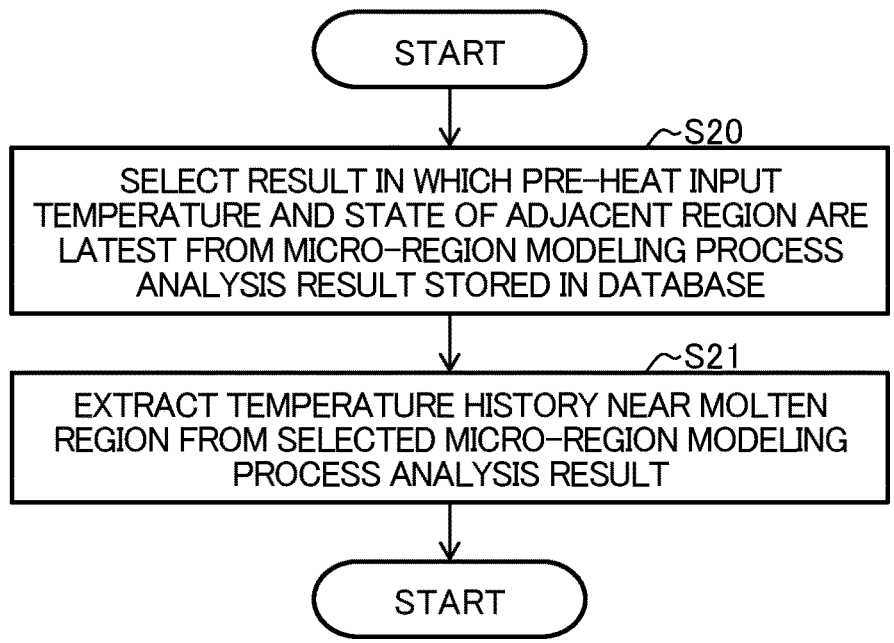
FIG. 11 is a flowchart showing processing of a temperature history extraction unit.

FIG. 11 is a flowchart showing processing of the temperature history extraction unit 33.

The temperature history extraction unit 33 selects, from the micro-region modeling process analysis result stored in the micro-region modeling process analysis result database 44, a result in which the pre-heat input temperature and the state of the adjacent region are the latest (step S20). Further, the temperature history extraction unit 33 extracts a temperature history near the molten region (a melt pool) from the selected micro-region modeling process analysis result (step S21), and ends the processing of FIG. 9.

Since the temperature history extraction unit 33 extracts the temperature history by referring to the database storing the analysis results, it is possible to obtain the temperature history that differs for each part in a short time.

Figure 12:
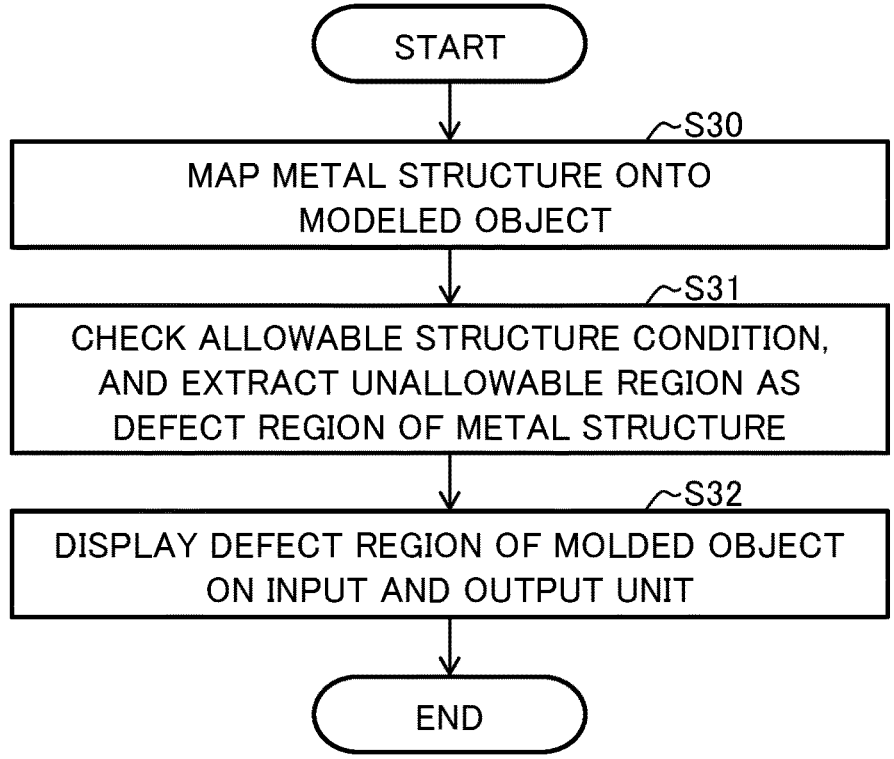
FIG. 12 is a flowchart showing processing of a structure distribution mapping unit and processing of a defective structure region extraction unit.

FIG. 12 is a flowchart showing processing of the structure distribution mapping unit 35 and processing of the defective structure region extraction unit 36.

First, the structure distribution mapping unit 35 maps the metal structure onto the modeled object (step S30).

The defective structure region extraction unit 36 checks an allowable structure condition, extracts an unallowable region as the defect region of the metal structure (step S31), and displays the region on the input and output unit 11 (step S32).

The defective structure region extraction unit 36 uses the solidification map to calculate, based on the temperature history, an index that affects reliability of the metal structure or the modeled object, such as the cooling rate or the temperature gradient, and displays the index on the input and output unit 11.

Figure 13:
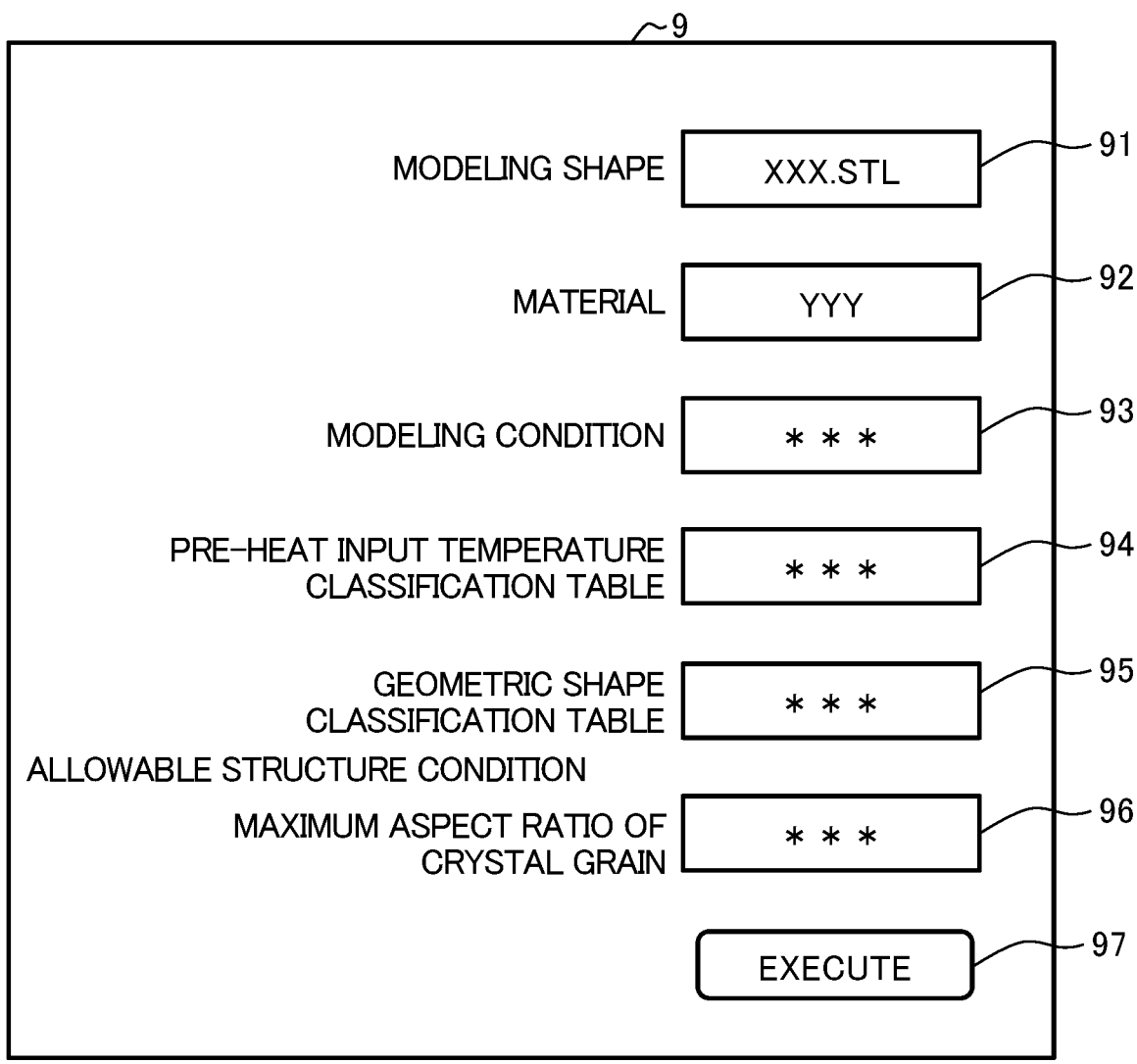
FIG. 13 is a diagram showing an input window displayed by an input and output unit.

FIG. 13 is a diagram showing an input screen 9 displayed by the input and output unit 11.

In the input and output unit 11, an operator can specify a modeling shape name 91, a material name 92, a modeling condition name 93, a pre-heat input temperature classification table name 94, and a geometric shape classification table name 95.

The modeling shape name 91 is a file name of the modeling shape handled by the input data generation device for additive manufacturing 1. The product shape input unit 21 acquires the file name of the modeling shape from the modeling shape name 91 and outputs information of this file to the macro-region modeling process analysis unit 31.

The material name 92 is a name of a material for modeling the three-dimensional object. The material input unit 22 acquires material information by the material name 92 and outputs the material information to the macro-region modeling process analysis unit 31.

The modeling condition name 93 is a condition name when the three-dimensional object is modeled. The device and modeling condition input unit 23 acquires a condition file when the three-dimensional object is modeled by the modeling condition name 93, and outputs the information of this file to the macro-region modeling process analysis unit 31.

The pre-heat input temperature classification table name 94 is a name of the pre-heat input temperature classification table 241 in which the temperature increment necessary for determining the defective structure, or the like is set as the boundary condition of the micro-region. The pre-heat input temperature classification table input unit 24 acquires the pre-heat input temperature classification table 241 by the pre-heat input temperature classification table name 94, and outputs the information of this file to the macro-region modeling process analysis unit 31.

The geometric shape classification table name 95 is a name of the geometric shape classification table 251 in which the classification of the geometric shapes (the powder shape, the molten shape, and the solidified shape) around the micro-region is set. The geometric shape classification table input unit 25 acquires the geometric shape classification table 251 by the geometric shape classification table name 95, and outputs the information of this file to the macro-region modeling process analysis unit 31.

An allowable structure condition index 96 is the allowable threshold value of the structure index. The allowable structure condition input unit 26 outputs the allowable threshold value, which is input to the allowable structure condition index 96, to the structure distribution mapping unit 35.

An execute button 97 is a button for executing an operation of the input data generation device for additive manufacturing 1.

Figure 14:
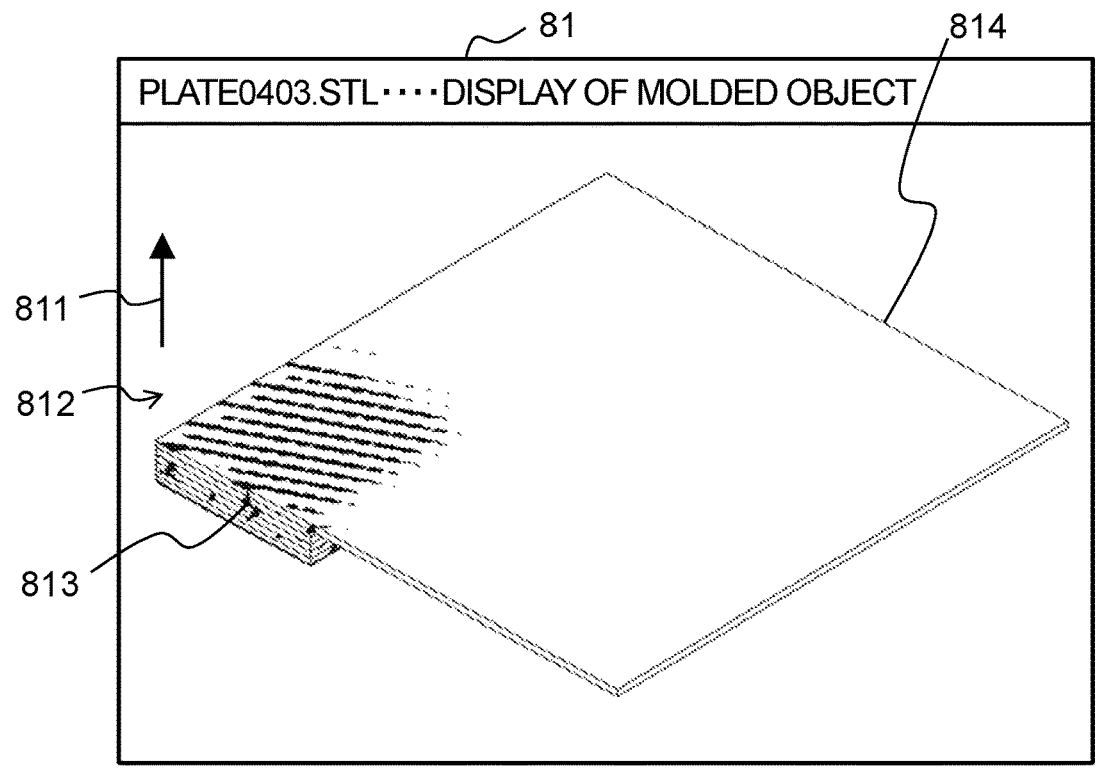
FIG. 14 is a diagram showing a display screen of a defect region.

FIG. 14 is a diagram showing a display screen 81 of a modeled object 812.

On the display screen 81, a file name "PLATE0403.STL" is displayed on a title bar, the modeled object 812 and an arrow 811 indicating the laminating direction are displayed on a window body. On the display screen 81, the input and output unit 11 displays the unallowable region as a defect region 813 in black and other regions in white. In this example, the defect region 813 is formed in a molten and solidified portion of a lower layer. A non-defect region 814 is formed in other positions.

Figure 15:
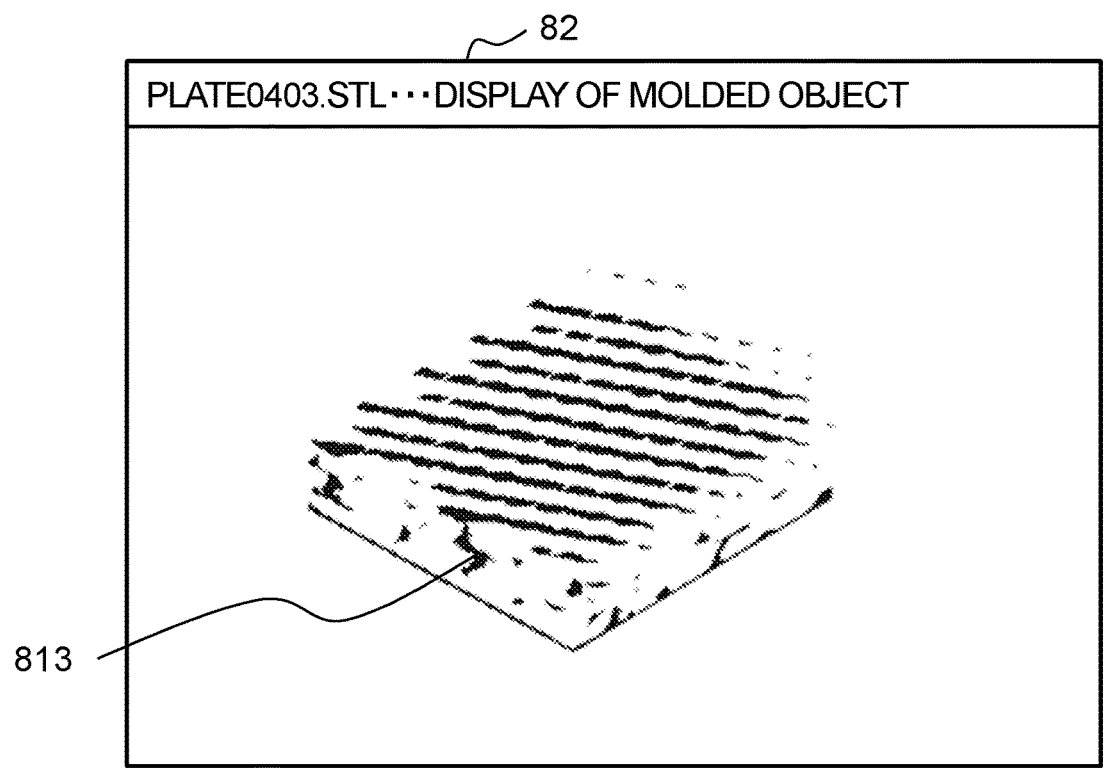
FIG. 15 is a diagram showing an extraction screen of the defect region.

FIG. 15 is a diagram showing an extraction screen 82 of the defect region 813.

On the extraction screen 82, the file name "PLATE0403.STL" is displayed on the title bar, and the defect region 813 extracted in the window body is displayed. As described above, according to the input data generation device for additive manufacturing 1 of the present embodiment, it is also possible to visualize the defect inside the modeled object.

According to the extraction screen 82, a position where a structure state value exceeds the allowable threshold value can be clearly specified. Therefore, it is possible to give a clue when a design of the modeled object is changed. As a result, it is possible to carry out a preliminary examination when a modeled object having the same material physical property is shaped.

(Modification)

The invention is not limited to the above embodiment, but includes various modifications. For example, the embodiments described above have been described in detail for easy understanding of the invention, and the invention is not necessarily limited to those including all the configurations described above. A part of the configuration of one embodiment can be replaced with the configuration of another embodiment, and the configuration of another embodiment can also be added to the configuration of one embodiment.

Other configurations may be added to, deleted from or replaced with a part of the configuration of each embodiment.

A part or all of the above configurations, functions, processing units, processing methods, or the like may be implemented by hardware such as an integrated circuit. The above configurations, functions, or the like may also be implemented by software by a processor interpreting and executing a program for implementing respective functions. Information such as a program, a table, and a file that implements each function can be stored in a recording device such as a memory, a hard disk, or a solid state drive (SSD), or in a recording medium such as a flash memory card or a digital versatile disk (DVD).

In the embodiments, a control lines or an information line shows those which are considered necessary for the description, and does not necessarily show all the control lines or the information lines on a product. It may be considered that almost all the configurations are actually connected to each other.

Modifications of the invention include, for example, the following (a) to (c).

(a) The mesh used in the macro-region of the modeled object is not limited to the hexahedron of the orthogonal lattice shape, but may be any geometrical shape such as a triangular prism or a hexagonal prism.

(b) The invention is not limited to the three-dimensional printer of the powder bed fusion bonding type, may be applied to a three-dimensional printer of a directed energy deposition type, and is not limited thereto.

(c) Only one of the pre-heat input temperature classification table and the geometric shape classification table may be applied.

REFERENCE SIGN LIST 1 input data generation device for additive manufacturing (design supporting device for additive manufacturing)
11 input and output unit
21 product shape input unit
22 material input unit
23 device and modeling condition input unit
24 pre-heat input temperature classification table input unit
241 pre-heat input temperature classification table
25 geometric shape classification table input unit
251 geometric shape classification table
26 allowable structure condition input unit
31 macro-region modeling process analysis unit (analysis unit)
32 micro-region additional analysis determination unit (additional analysis determination unit)
33 temperature history extraction unit
34 structure prediction unit
35 structure distribution mapping unit (mapping unit)
36 defective structure region extraction unit (extraction unit)
41 modeling device database
42 material physical property database
43 micro-region modeling process analysis unit (analysis unit)
44 micro-region modeling process analysis result database (database)
5 three-dimensional printer
51 chamber
52 stage
53 support portion
54 laser
61 material powder
62 three-dimensional object
81 display screen
7 modeled object
71 hexahedral mesh
71L, 71R, 71B mesh
72 to 75 side surface
76 bottom surface
77 upper surface
811 arrow
812 modeled object
813 defect region
814 non-defect region
82 extraction screen
91 modeling shape name
92 material name
93 modeling condition name
94 pre-heat input temperature classification table name
95 geometric shape classification table name
96 allowable structure condition index
97 execute button

The invention claimed is:

1. An additive-manufactured object design supporting device, comprising:
an analysis unit configured to analyze a modeling process of a macro-region and a micro-region of a modeled object, which is an additive-manufactured object, by using a shape, a material condition, and a modeling condition of the modeled object as input, wherein the macro-region includes an entirety of the modeled object and the micro-region is a part of the macro-region;
a temperature history extraction unit configured to extract, from a database, a temperature history of the micro-region, which is stored in the database as part of a temperature analysis result of the macro-region;
a mapping unit configured to map a structure distribution obtained from a temperature history distribution of the modeled object to the modeled object;
an extraction unit configured to extract a defective structure of the modeled object that does not satisfy a structure condition of the modeled object by using an allowable structure condition as input;
an additional analysis determination unit configured to determine a temperature boundary condition of a temperature of the micro-region based on a pre-heat input temperature classification table of threshold temperatures of the micro-region before and after a heat input that are stored in the database, and cause the analysis unit to analyze the micro-region when the temperature boundary condition is different from a temperature boundary condition of a temperature of the macro-region, and add an analysis result of analyzing the micro-region to the database; and
a three-dimensional printer configured to output the modeled object as a three-dimensional object.

2. The additive-manufactured object design supporting device according to claim 1, wherein
the threshold temperatures in the pre-heat input temperature classification table are used to determine the defective structure.

3. An additive-manufactured object design supporting device, comprising:
an analysis unit configured to analyze a modeling process of a macro-region and a micro-region of a modeled object, which is an additive-manufactured object, by using a shape, a material condition, and a modeling condition of the modeled object as input, wherein the macro-region includes an entirety of the modeled object and the micro-region is a part of the macro-region;

a temperature history extraction unit configured to extract, from a database, a temperature history of the micro-region, which is stored in the database as part of a temperature analysis result of the macro-region;

a mapping unit configured to map a structure distribution obtained from a temperature history distribution of the modeled object to the modeled object;

an extraction unit configured to extract a defective structure of the modeled object that does not satisfy a structure condition of the modeled object by using an allowable structure condition as input;

an additional analysis determination unit configured to determine a geometric shape classification of the micro-region based on a geometric shape classification table stored in the database, the geometric shape classification table including a plurality of different geometric shapes of the micro-region, and to cause the analysis unit to analyze the micro-region when the geometric shape classification is different from a geometric shape classification of the macro-region, and add an analysis result of analyzing the micro-region to the database; and a three-dimensional printer configured to output the modeled object as a three-dimensional object.

4. The additive-manufactured object design supporting device according to claim 3, wherein the plurality of different geometric shapes includes a powder shape, a molten shape, and a solidified shape, which are used to determine the defective structure.

5. An additive-manufactured object design supporting method, comprising:

a step of analyzing a modeling process of a macro-region and a micro-region of a modeled object, which is an additive-manufactured object, by using a shape, a material condition, and a modeling condition of the modeled object as input, wherein the macro-region includes an entirety of the modeled object and the micro-region is a part of the macro-region;

a step of extracting, from a database, a temperature history of the micro-region, which is stored in the database as part of a temperature analysis result of the macro-region;

a step of mapping a structure distribution obtained from a temperature history distribution of the modeled object to the modeled object;

a step of extracting a defective structure of the modeled object that does not satisfy a structure condition of the modeled object by using an allowable structure condition as input;

a step of determining a temperature boundary condition of a temperature of the micro-region based on a pre-heat input temperature classification table of threshold temperatures of the micro-region before and after a heat input that are stored in the database, analyzing the micro-region when the temperature boundary condition is different from a temperature boundary condition of a temperature of the macro-region, and adding an analysis result of analyzing the micro-region to the database; and a step of outputting, by a three-dimensional printer, the modeled object as a three-dimensional object.

* * * * *